United States Patent
Sharma et al.

(10) Patent No.: US 10,555,357 B1
(45) Date of Patent: Feb. 4, 2020

(54) COMMUNICATING WITH A WIRELESS DEVICE VIA AT LEAST TWO ACCESS NODES

(71) Applicant: Sprint Spectrum LP, Overland Park, KS (US)

(72) Inventors: Ankur Sharma, Plano, TX (US); Noman Alam, Chantilly, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 162 days.

(21) Appl. No.: 15/902,367

(22) Filed: Feb. 22, 2018

(51) Int. Cl.
| | |
|---|---|
| *H04W 76/15* | (2018.01) |
| *H04W 88/04* | (2009.01) |
| *H04W 72/04* | (2009.01) |
| *H04L 12/761* | (2013.01) |
| *H04W 72/08* | (2009.01) |
| *H04W 40/22* | (2009.01) |

(52) U.S. Cl.
CPC ............ *H04W 76/15* (2018.02); *H04L 45/16* (2013.01); *H04W 40/22* (2013.01); *H04W 72/0486* (2013.01); *H04W 72/08* (2013.01); *H04W 88/04* (2013.01)

(58) Field of Classification Search
CPC . H04W 76/15; H04W 72/0486; H04W 72/08; H04W 40/22; H04W 88/04; H04L 45/16
See application file for complete search history.

(56) References Cited

U.S. PATENT DOCUMENTS

| | | | |
|---|---|---|---|
| 9,526,044 B2 | 12/2016 | Choi et al. | |
| 2014/0206361 A1* | 7/2014 | Centonza | H04W 36/24 455/444 |
| 2014/0351447 A1* | 11/2014 | Annamalaisami | H04L 65/1069 709/227 |
| 2017/0251515 A1* | 8/2017 | Altman | H04L 43/08 |
| 2018/0206282 A1* | 7/2018 | Singh | H04W 88/06 |

FOREIGN PATENT DOCUMENTS

| | | |
|---|---|---|
| WO | 2014/179982 A1 | 11/2014 |
| WO | WO-2014179982 A1 * | 11/2014 |

* cited by examiner

*Primary Examiner* — Khaled M Kassim
*Assistant Examiner* — Saad A. Waqas

(57) ABSTRACT

Systems, methods, and processing nodes for communicating with a wireless device via at least two access nodes include communicating with a wireless device via at least two access nodes includes receiving, at a relay access node coupled to a donor access node, downlink data intended to be transmitted to an end-user wireless device attached to the relay access node; determining that a signal condition at the relay access node meets a criteria; and in response to determining that the signal condition meets the criteria, forwarding the downlink data to the donor access node. The donor access node transmits the downlink data to the end-user wireless device, and the relay access node maintains a control channel with the end-user wireless device.

18 Claims, 10 Drawing Sheets

COMMUNICATING WITH A WIRELESS DEVICE VIA AT LEAST TWO ACCESS NODES

TECHNICAL BACKGROUND

Wireless networks incorporating access nodes, relay access nodes, and other small-cell access nodes are becoming increasingly common, and may be referred to as heterogeneous networks. Relay access nodes improve service quality by relaying communication between an access node, and wireless devices in the wireless network. For example, relay access nodes may be used at the edge of a coverage area of an access node to improve coverage and/or service, as well as in crowded areas having a high number of other wireless devices to increase the available throughput to the wireless devices being relayed. Relay access nodes are generally configured to communicate with the access node (i.e. a "donor" access node) via a wireless backhaul connection, and to deploy a radio air-interface to which wireless devices can attach.

"Dual Connectivity" refers to the ability for wireless devices to attach to at least two access nodes, and transmit/receive information via two wireless connections simultaneously. However, there are limits to utilizing dual connectivity in networks comprising access nodes and relay access nodes.

OVERVIEW

Exemplary embodiments described herein include systems, methods, and processing nodes for communicating with a wireless device via at least two access nodes. An exemplary method described herein for communicating with a wireless device via at least two access nodes includes receiving, at a relay access node coupled to a donor access node, downlink data intended to be transmitted to an end-user wireless device attached to the relay access node; determining that a signal condition at the relay access node meets a criteria; and in response to determining that the signal condition meets the criteria, forwarding the downlink data to the donor access node. The donor access node transmits the downlink data to the end-user wireless device, and the relay access node maintains a control channel with the end-user wireless device.

An exemplary system described herein for communicating with a wireless device via at least two access nodes includes a donor access node configured to provide a first radio air interface to which a wireless device is attached, and a relay access node configured to attach to the first radio air interface and to provide a second radio air interface to which the wireless device is further attached. The relay access node is further configured to perform operations comprising receiving downlink data from the donor access node, the downlink data being addressed to the end-user wireless device; determining that a signal condition meets a criteria; and in response to determining that the signal condition meets the criteria, rerouting the downlink data to the donor access node. The donor access node is further configured to perform operations comprising receiving the downlink data rerouted from the relay access node; and transmitting the downlink data to the end-user wireless device.

An exemplary processing node described herein for communicating with a wireless device via at least two access nodes is configured to perform operations including receiving, at a relay access node, data packets addressed to a wireless device, wherein the wireless device is associated with a first network address and a second network address, and wherein the data packets are addressed to the second address of the wireless device; determining that a signal condition at the relay access node meets a threshold; and rerouting the data packets to a donor access node communicatively coupled to the relay access node. The donor access node forwards the data packets to the second address of the wireless device.

DETAILED DESCRIPTION

Figure 1:
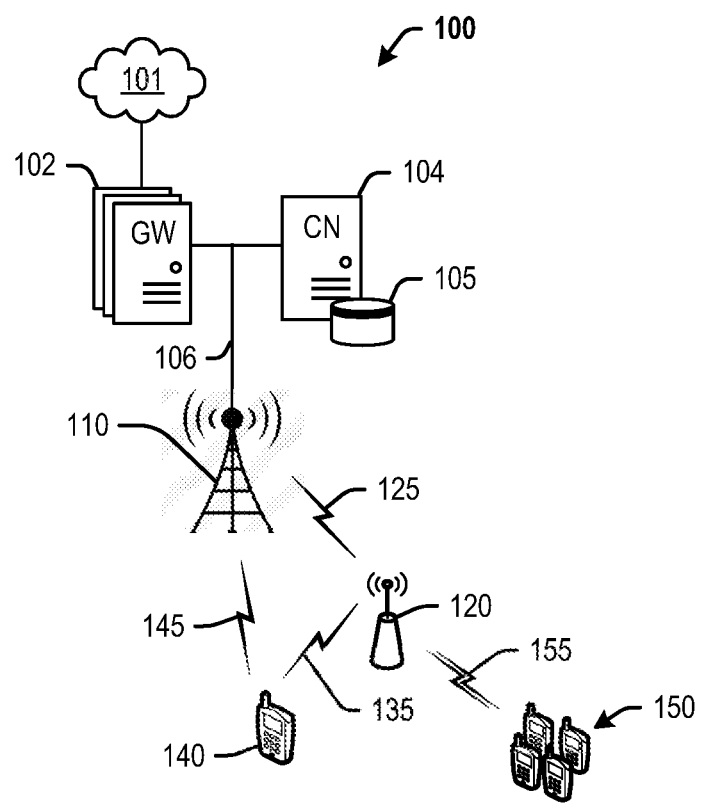
FIG. 1 depicts an exemplary system for communicating with a wireless device via at least two access nodes.

Exemplary embodiments described herein include systems, methods, and processing nodes for communicating with a wireless device via at least two access nodes. An exemplary system described herein includes at least a donor access node, such as an eNodeB in long-term evolution (LTE) networks, and a relay access node in wireless communication with the donor access node. The donor access node is configured to deploy a first wireless air-interface to which wireless devices and/or relay access nodes can attach. The relay access node is configured to communicate with the donor access node via a wireless backhaul connection (hereinafter, "backhaul") provided on the first wireless air-interface, and is further configured to deploy a second wireless air-interface to which wireless devices can attach and access network services from the donor access node. In other words, the relay access node is configured to relay data packets between the donor access node and wireless devices attached to the relay access node.

Further, wireless devices illustrated herein are generally capable of communicating with at least two access nodes. In LTE networks, this capability is termed "dual connectivity." The exemplary embodiments disclosed herein include systems, methods, and processing nodes that are configured to perform dual connectivity operations for wireless devices attached to a combination of a donor access node and a relay access node, as described above. Systems described herein include at least a donor access node configured to provide a first radio air interface to which an end-user wireless device is attached, and a relay access node configured to attach to the first radio air interface and to provide a second radio air interface to which the end-user wireless device is further attached. The end-user wireless device may be associated with at least two network addresses such as, for instance, first and second internet protocol (IP) addresses. The first IP address may be associated with a direct communication path between the donor access node and the end-user wireless device, and the second IP address may be associated with a relay communication path, i.e. between the relay access node and the end-user wireless device.

In exemplary embodiments described herein, the relay access node may be configured to perform operations comprising receiving downlink data from the donor access node, the downlink data being addressed to the end-user wireless device, determining that a signal condition meets a criteria and, in response to determining that the signal condition meets the criteria, rerouting the downlink data to the donor access node. Further, the donor access node may be configured to perform operations comprising receiving the downlink data rerouted from the relay access node, and transmitting the downlink data to the end-user wireless device. The signal condition may be associated with a wireless link between the relay access node and the donor access node, or a wireless link between the relay access node and the end-user wireless device, and may further comprise a threshold level of one or more of a signal-to-interference-plus-noise ratio (SINR), a modulation and coding scheme (MCS) granted by the donor access node to the relay access node, an uplink power level granted to the relay access node, an error rate of downlink data received at the relay access node from the donor access node, a number of end-user wireless devices attached to the relay access node, or a traffic load of the relay access node. Thus, upon determining less-than-ideal signal conditions associated with delivery of downlink data to the end-user wireless device, the relay access node forwards its portion of the downlink data from the donor access node to the end-user wireless device. The relay access node further maintains control of the transmission of the downlink data from the donor access node to the end-user wireless device, thereby reducing the frequency of handovers and retransmissions caused by the poor signal conditions determined by the relay access node.

The downlink data may comprise a portion of a protocol data unit (PDU), such as a data packet or similar unit of data. The PDU may be divided or split into one or more portions of data, with each portion of data being transmitted to the end-user wireless device via a different communication path, and to a different network address. For example, the PDU may be addressed to the first network address of the wireless device. Upon receiving the PDU, a network element such as a gateway node may split the PDU into first and second portions, map different bearers to each portion, and address each portion to the first and second network addresses respectively. For instance, the gateway (or any other core network node) may generate first and second internal IP addresses, which are both associated with the same wireless device, but are mapped to different bearers. Further, each of the first and second bearers is associated with a different access node. For example, the first bearer is associated with the donor access node, and the second bearer is associated with the relay access node, wherein the second bearer further traverses a relay gateway and the donor access node in order to reach the relay access node. Thus, the aforementioned downlink data that is rerouted from the relay access node to the donor access node comprises a portion of the PDU that was originally intended to be transmitted to the second network address of the end-user wireless device via the relay access node (and gateways associated therewith).

Further, while the donor access node is instructed to transmit the downlink data directly to the second network address of the end-user wireless device, the relay access node maintains the control channel with the second network address of the end-user wireless device. To enable control of the data transmitted from the donor access node directly to the end-user wireless device, the control channel may connect the relay access node to the donor access node via gateways associated with both the relay access node and the donor access node, as further described herein. Moreover, to ensure that the donor access node correctly transmits the rerouted downlink data to the second network address of the end-user wireless device, the relay access node is further configured to transmit an indicator to the donor access node that the downlink data is intended to be transmitted from the donor access node to the second network address of the end-user wireless device. The indicator may be transmitted to the donor access node (along with the rerouted downlink data) via a data channel between the relay access node and the donor access node. The data channel may be set up on a communication link on the wireless air interface of the donor access node to which the relay access node attaches, i.e. the backhaul link. Further, the data channel between the relay access node and the donor access node, as well as the control channel traversing the relay and donor gateways, may be implemented using X2 connections, including X2-U connections for the data channel and X2-C connections for the control channel.

Further, in addition to the systems and methods described herein, these operations may be implemented as computer-readable instructions or methods, and processing nodes on the network for executing the instructions or methods. For example, a processing node coupled to a relay access node, a scheduler within the relay or donor access nodes, or a gateway or controller node, may be configured to perform the operations described herein. These and other embodiments are further described with reference to FIGS. 1-10 below.

FIG. 1 depicts an exemplary system for scheduling resources for relay access nodes in a wireless network. System 100 comprises a communication network 101, gateway node(s) 102, controller node 104, access node 110, relay access node 120, and wireless device 140. In other embodiments, any other combination of donor access nodes, relay access nodes, and wireless devices may be evident to those having ordinary skill in the art in light of this disclosure. In this exemplary embodiment, access node 110 may be a macrocell access node configured to deploy a wireless air-interface to which relay access node 120 and wireless device 140 can attach. For example, relay access node 120 may be configured to communicate with access node 110 over communication link 125, hereinafter referred to as a wireless backhaul or simply "backhaul", while wireless device 140 may be configured to communicate with access node 110 over a wireless communication link 145. Relay access node 120 is further configured to deploy an additional wireless air-interface to which wireless device 140 and wireless devices 150 can attach. Relay access node 120 is thus configured to relay data between donor access node 110 and wireless devices 140, 150, such that wireless devices 140, 150 may access network services using relay access node 120, rather than overload donor access node 110, which may be serving numerous other devices, such as wireless device 140. Moreover, wireless devices 150 that are outside a coverage area of access node 110 may access network services from donor access node 110 by virtue of being connected to relay access node 120.

Further, as described herein, wireless device 140 is capable of dual connectivity, i.e. simultaneously communicating with both donor access node 110 and relay access node 120. For example, wireless device 140 is configured with multi-access PDN connectivity (MAPCON), whereby wireless device 140 can send and receive data packets using two network addresses associated therewith. Further, to enable dual connectivity in system 100, a processing node communicatively coupled to one or both of gateway node(s) 102 and controller node 104 may be configured to generate at least one second address for wireless device 140 in addition to a default (or first) address for wireless device 140, map each of the two addresses to a corresponding bearer, divide data received from network 101 and addressed to wireless device 140 into first and second portions respectively addressed to the at least two addresses, and transmit the first and second portions to wireless device 140 via donor access node 110 and relay access node 120 respectively.

The first portion may be transmitted in a first corresponding bearer mapped to the first address, and second portion transmitted in a second corresponding bearer mapped to the second address. For example, in LTE systems, the bearers comprise evolved packet-switched system (EPS) bearers. Further in LTE systems, gateway node(s) 102 comprise at least a packet data network (PDN) gateway (hereinafter, "P-GW") for receiving data from network 101 and generating bearers to transmit the data to components within system 100, a serving gateway (S-GW) configured to divide the data and map the corresponding bearers to the two addresses of wireless device 140 and transmit the first portion to access node 110, and a relay S-GW configured to receive the second portion from the S-GW and forward the second portion to relay access node 120 via backhaul 125. Further in LTE systems, controller node 104 comprises a mobility management entity (MME), which is further configured to receive attach requests from at least wireless device 140, and determine that wireless device 140 is capable of attaching to both donor access node 110 and relay access node 120 simultaneously, based on the attach requests. Alternatively or in addition, the MME may be configured to determine a MAPCON capability of wireless device 140 based on a device capabilities message received at donor access node 110.

The data addressed to wireless device 140 may comprise a protocol data unit (PDU), such as a data packet or similar unit of data. The data may be divided into the first and second portions by splitting the PDU into the first and second portions. A size of the first and second portions of data may be determined based on a load level of each of donor access node 110 and relay access node 120. For example, as further described herein, controller node 104 and/or gateway node(s) 102 (also known as "core network" in LTE systems) may be directly connected to at least donor access node 110 via communication link 106, and receive load information therefrom. Further, relay access node 120 may transmit load information to donor access node 110, which in turn transmits the load information to the core network. Upon receiving the data, an S-GW within gateway node(s) 102 may transmit the first portion of the data within a first bearer to donor access node 110, and the second portion of the data within a second bearer to relay access node 120 (via at least a relay S-GW). Each of donor access node 110 and relay access node 120 respectively forwards the first and second data portions to the first and second addresses of wireless device 140. Further, the first and second bearers may be generated (either prior to receiving the data or upon receiving the data) by a P-GW within gateway node(s) 102.

Thus, in exemplary embodiments illustrated herein, relay access node 120 determines that a signal condition in one or both of communication links 135, 125 deteriorates to beyond a threshold criteria, and forwards the second portion to donor access node 110 to be transmitted to end-user wireless device 140 via communication link 145. In particular, relay access node 120 may be configured to perform operations comprising receiving downlink data from donor access node 120, the downlink data being a split portion of a PDU addressed to end-user wireless device 140, determining that a signal condition meets a criteria and, in response to determining that the signal condition meets the criteria, rerouting the downlink data to donor access node 110. Further, donor access node 110 may be configured to perform operations comprising receiving the downlink data rerouted from relay access node 120, and transmitting the downlink data to end-user wireless device 140. The signal condition may be associated with wireless links 125 or 135. For example, the signal condition may comprise a threshold level of one or more of a signal-to-interference-plus-noise ratio (SINK), or a modulation and coding scheme (MCS) granted by the donor access node to the relay access node. Either of these signal conditions meets a criteria when it crosses a low threshold, rendering communication links 125, 135 unsuitable to transmit downlink data. Alternatively or in addition, the signal condition may comprise an uplink power level granted to relay access node 120, an error rate of downlink data received at relay access node 120 from donor access node 110, a number of end-user wireless devices 140, 150 attached to relay access node 120, or a traffic load of relay access node 120. Either of these signal conditions meets a criteria when it crosses a high threshold.

Thus, upon determining less-than-ideal signal conditions associated with delivery of downlink data to end-user wireless device 140, relay access node 120 forwards its portion of the downlink data from donor access node 110 to end-user wireless device 140. Relay access node 120 further maintains control of the transmission of the downlink data from donor access node 110 to end-user wireless device 140, thereby reducing the frequency of handovers and retransmissions caused by the poor signal conditions determined by the relay access node. In other words, while donor access node 110 is instructed to transmit the downlink data directly to the second network address of end-user wireless device 140, relay access node 120 maintains the control channel with the second network address of end-user wireless device 140. To enable control of the data transmitted from donor access node 110 directly to end-user wireless device 140, the control channel may connect relay access node 120 to donor access node 110 via gateways 102 associated with both relay access node 120 and donor access node 110. To ensure that donor access node 110 correctly transmits the rerouted downlink data to the second network address of end-user wireless device 140, relay access node 120 is further configured to transmit an indicator to donor access node 110 that the downlink data is intended to be transmitted from donor access node 110 to the second network address of end-user wireless device 140. The indicator may be transmitted to donor access node 110 (along with the rerouted downlink data) via a data channel between relay access node 120 and donor access node 110. The data channel may be set up on backhaul communication link 125 and may be implemented using X2 connections, including X2-U connections for the data channel and X2-C connections for the control channel, which may traverse one or more gateways 102.

Access node 110 can be any network node configured to provide communication between wireless devices 140, 150 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Further relay access node 120 may comprise any short range, low power, small-cell access nodes such as a microcell access node, a picocell access node, a femtocell access node, or a home eNodeB device. In addition, relay access node 120 may comprise a small-cell access node paired with a relay wireless device configured to communicate over backhaul 125, as further described herein.

Access node 110 and relay access node 120 can each comprise a processor and associated circuitry to execute or direct the execution of computer-readable instructions to perform operations such as those further described herein. Briefly, access node 110 and relay access node 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay access node 120 can receive instructions and other input at a user interface. Access node 110 communicates with gateway node 102 and controller node 104 via communication links 106, 107. Access node 110 and relay access node 120 may communicate with each other, and other access nodes (not shown), using wireless link or backhaul 125, or a wired link. Components of exemplary access nodes 110 and relay access node 120 are further described with reference to FIGS. 2-4.

Wireless devices 140, 150 may be any device, system, combination of devices, or other such communication platform capable of communicating wirelessly with access node 110 and/or relay access node 120 using one or more frequency bands deployed therefrom. Each of wireless devices 140, 150 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 140, 150. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. Gateway node(s) 102 can further include a relay S-GW and relay P-GW that perform equivalent functions as S-GW and P-GW for relay access node 120. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as configurations and capabilities of access node 110, relay access node 120, wireless devices 140, 150, network addresses of wireless device 140, mappings of internal network addresses with corresponding bearers, signal conditions related to relay access node 120, criteria and/or thresholds associated therewith, and so on. This information may be requested by or shared with gateway node(s) 102 and/or access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: gateway node(s) 102, controller node 104, access node 110, relay access node 120, and/or network 101.

Figure 2:
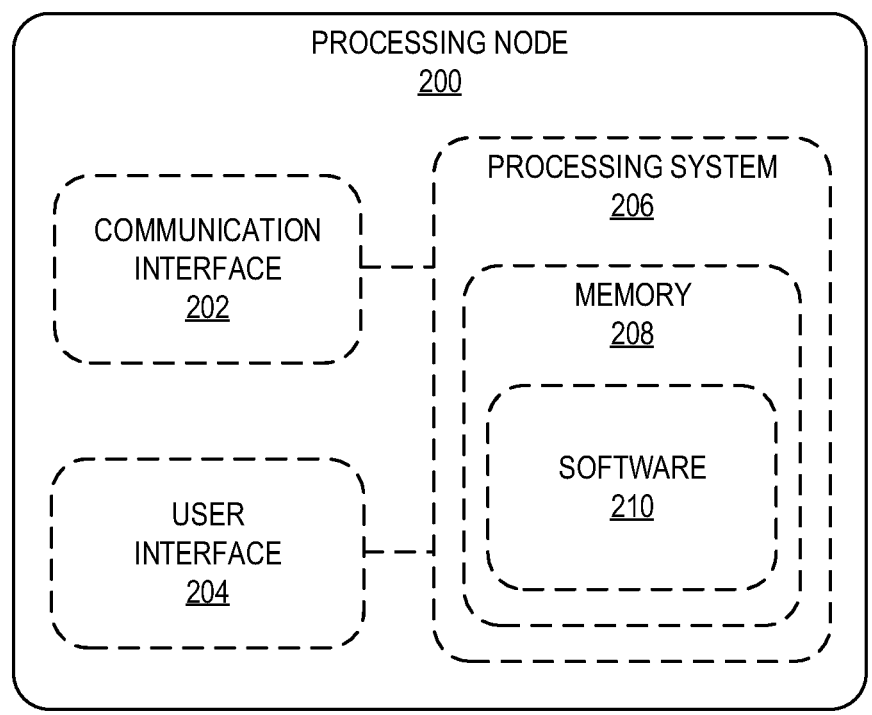
FIG. 2 depicts an exemplary processing node for communicating with a wireless device via at least two access nodes.

FIG. 2 depicts an exemplary processing node for scheduling resources for relay access nodes in a wireless network. Processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a module for performing transmission power control operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
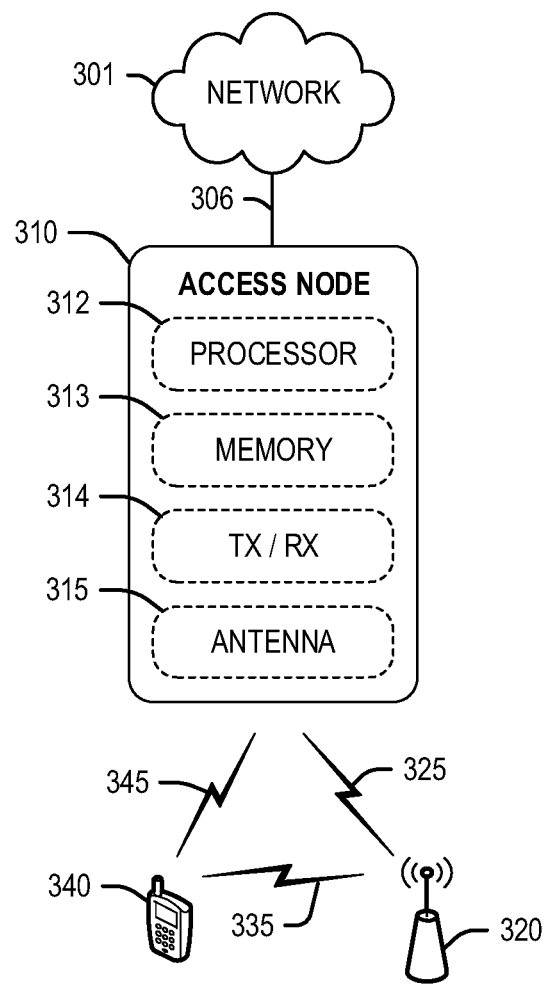
FIG. 3 depicts an exemplary access node.

FIG. 3 depicts an exemplary access node 310. Access node 310 may comprise, for example, a macro-cell access node, such as access node 110 described with reference to FIG. 1. Access node 310 is illustrated as comprising a processor 312, memory 313, transceiver 314, and antenna 315. Processor 312 executes instructions stored on memory 313, while transceiver 314 and antenna 315 enable wireless communication with wireless device 340 and relay access node 320. Instructions stored on memory 313 can include deploying an air-interface carrier to which wireless device 340 can attach to access network services directly, and to which relay access node 320 can attach and relay data packets between access node 310 and wireless device 340. Thus, access node 310 may be referred to as a donor access node. Donor access node 310 may further be configured to receive data packets encapsulated within a first bearer addressed to a first network address of wireless device 340, and transmit said data packets within the first bearer to wireless device 340 via communication link 345. Donor access node 310 may further be configured to receive data packets encapsulated within a second bearer addressed to a second network address of wireless device 340, and transmit said data packets within the second bearer to relay access node 320 via backhaul 325, wherein relay access node 320 forwards the data packets within the second bearer to wireless device 340 via communication link 335.

Further, donor access node 310 may be configured to perform operations comprising receiving downlink data rerouted from relay access node 320 (i.e. the data packets encapsulated within the second bearer addressed to the second network address of wireless device 340). Relay access node 320 may be configured to reroute the downlink data in response to a signal condition measured at relay access node 320 meeting a criteria. The signal condition may be associated with backhaul 325 and/or communication link 335, and may further comprise a threshold level of one or more of a signal-to-interference-plus-noise ratio (SINR), a modulation and coding scheme (MCS) granted by the donor access node to relay access node 320, an uplink power level granted to relay access node 320 (by, for instance, donor access node 310), an error rate of downlink data received at relay access node 320 from donor access node 310, a number of end-user wireless devices attached to relay access node 320, or a traffic load of relay access node 320. Thus, upon determining less-than-ideal signal conditions associated with delivery of downlink data to end-user wireless device 340, relay access node 320 reroutes its portion of the downlink data to end-user wireless device 340 via donor access node 310. Relay access node 320 further maintains control of the transmission of the downlink data from donor access node 320 to end-user wireless device 340, thereby reducing the frequency of handovers and retransmissions caused by the poor signal conditions determined by the relay access node. To ensure that donor access node 310 correctly transmits the rerouted downlink data to the second network address of end-user wireless device 340, donor access node 310 is further configured to recognize or detect an indicator received from relay access node 320, the indicator for indicating to donor access node 310 that the downlink data is intended to be transmitted from donor access node 310 to the second network address of end-user wireless device 340. The indicator may be transmitted to donor access node 310 (along with the rerouted downlink data) via a data channel between relay access node 320 and donor access node 320. The data channel may be set up on, for example, backhaul link 325. Further, the data channel between relay access 320 node and donor access node 310, as well as the control channel traversing the relay and donor gateways (not shown herein), may be implemented using X2 connections, including X2-U connections for the data channel and X2-C connections for the control channel.

Figure 4:
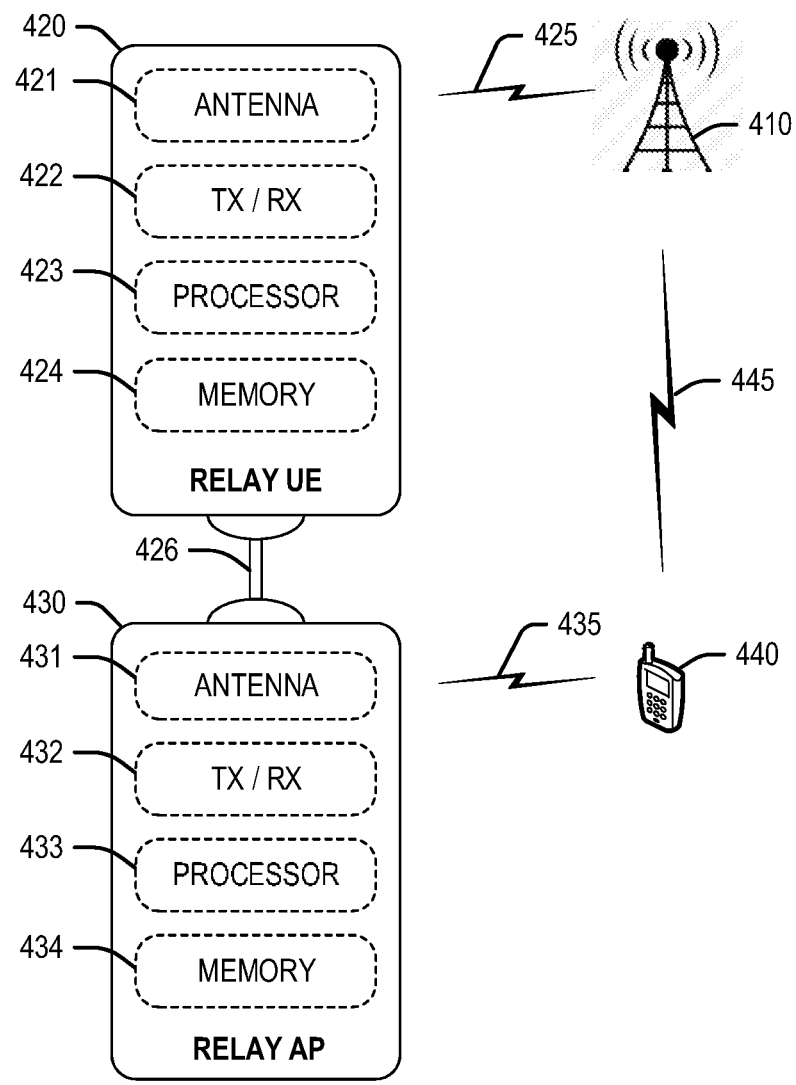
FIG. 4 depicts an exemplary relay access node comprising a relay wireless device and a relay access point.

FIG. 4 depicts an exemplary relay access node comprising a relay wireless device (UE) 420 and a relay access point (AP) 430. Relay wireless device 420 is illustrated as comprising an antenna 421 for direct (i.e. unrelayed) communication with donor access node 410 via wireless backhaul link 425, a transceiver 422, a processor 423, and a memory 424 for storing instructions that enable relay wireless device 420 to perform operations described herein. In some embodiments, relay wireless device 420 is referred to as a customer premise equipment (CPE), which includes any stationary LTE wireless device having a stronger computational & RF capability versus standard wireless devices, as well as a directional antenna and a dedicated power supply, enabling relay wireless device 420 to efficiently provide resources to wireless device 440 via relay access point 430. Consequently, relay access point 430 may be co-located with relay wireless device 420, and is connected to relay wireless device 420 via a communication interface 426. Communication interface 426 may be any interface that enables direct communication between relay wireless device 420 and relay access point 430, such as USB, FireWire, Ethernet, or any other serial, parallel, analog, or digital interface.

In operation, relay wireless device 420 may be configured to relay network services from donor access node 410 to wireless device 440 via relay access point 430. Relay wireless device 420 may begin to function as a relay wireless device by sending a message to donor access node 410 to indicate to donor access node 410 that wireless device 420 is functioning as a relay wireless device. In some embodiments, relay wireless device 420 can request to send a buffer status report to donor access node 410. Donor access node 410 can grant this request in a conventional manner. Relay wireless device 420 may respond to the grant by sending a short buffer status report. This short buffer status report is associated with a logical channel group that indicates the buffer status report is communicating the status of relay wireless device 420 as a relay, and thus is not asking for additional resource allocations (like a 'conventional' buffer status report would indicate). In other words, when relay wireless device 420 responds with a buffer status report for the 'special' logical channel group, it means that the buffer status report is not actually reporting the status of a buffer. Rather, this buffer status report indicates that the wireless device is now functioning as a relay. Once status of relay wireless device 420 is established, relay wireless device 420 may instruct relay access point 430 to start accepting connection requests from one or more wireless devices such as wireless device 440. Further, based on the indication of relay status, donor access node 410 may alter how relay wireless device 420 is treated. For example, relay wireless device 420 may be provided with preferential treatment because it is functioning as a relay.

Relay access point 430 is illustrated as comprising an antenna 431 and transceiver 432 for enabling communication with wireless device 440, processor 433, and a memory 434 for storing instructions that are executed by processor 433. In some embodiments, relay access point 430 may be a home eNodeB. Moreover, although only one transceiver is depicted in each of relay wireless device 420 and relay access point 430, additional transceivers may be incorporated in order to facilitate communication across interface 426 and other network elements. In operation, relay wireless device 420 and/or relay access point 430 may be configured to receive data packets encapsulated within a second bearer addressed to a second network address of wireless device 440 via backhaul 425, and transmit said data packets within the second bearer to wireless device 440 via communication link 435. Further, relay wireless device 420 and/or relay access point 430 may be configured to determine that a signal condition in one or both of communication links 435, 425 deteriorates to beyond a threshold criteria, and forwards the data packets (addressed to the second address of wireless device 440) to donor access node 410 to be transmitted to end-user wireless device 440 via communication link 445. In particular, relay wireless device 420 and/or relay access point 430 may be configured to perform operations comprising receiving downlink data from donor access node 410, the downlink data being a split portion of a PDU addressed to end-user wireless device 440, determining that a signal condition meets a criteria and, in response to determining that the signal condition meets the criteria, rerouting the downlink data to donor access node 410. Further, donor access node 410 may be configured to perform operations comprising receiving the downlink data rerouted from relay wireless device 420, and transmitting the downlink data to end-user wireless device 440. The signal condition may be associated with wireless links 425 or 435. For example, the signal condition may comprise a threshold level of one or more of a signal-to-interference-plus-noise ratio (SINR), or a modulation and coding scheme (MCS) granted by donor access node 410 to relay wireless device 420. Either of these signal conditions meets a criteria when it crosses a low threshold, rendering communication links 425, 435 unsuitable to transmit downlink data. Alternatively or in addition, the signal condition may comprise an uplink power level granted to relay wireless device 420, an error rate of downlink data received at relay wireless device 420 and/or relay access point 430 from donor access node 410, a number of end-user wireless devices 440 attached to relay access point 430, or a traffic load of relay wireless device 420 and/or relay access point 430. Either of these signal conditions meets a criteria when it crosses a high threshold.

Thus, upon determining less-than-ideal signal conditions associated with delivery of downlink data to end-user wireless device 440, relay wireless device 420 and/or relay access point 430 forwards its portion of the downlink data to donor access node 410. Relay wireless device 420 and/or relay access point 430 further maintains control of the transmission of the downlink data from donor access node 410 to end-user wireless device 440, thereby reducing the frequency of handovers and retransmissions caused by the poor signal conditions determined by the relay access node. In other words, while donor access node 410 is instructed to transmit the downlink data directly to the second network address of end-user wireless device 440, relay wireless device 420 and/or relay access point 430 maintains the control channel with the second network address of end-user wireless device 440. To enable control of the data transmitted from donor access node 410 directly to end-user wireless device 440, the control channel may connect relay wireless device 420 and/or relay access point 430 to donor access node 410 via gateways as further described herein and with reference to FIG. 10.

Further, to ensure that donor access node 410 correctly transmits the rerouted downlink data to the second network address of end-user wireless device 440, relay wireless device 420 and/or relay access point 430 is further configured to transmit an indication to donor access node 410 that the downlink data is intended to be transmitted from donor access node 410 to the second network address of end-user wireless device 440. The indication may be transmitted to donor access node 410 (along with the rerouted downlink data) via a data channel on backhaul 425 and may be implemented using X2 connections, including X2-U connections for the data channel and X2-C connections for the control channel, which may traverse one or more gateways as further described herein.

Figure 5:
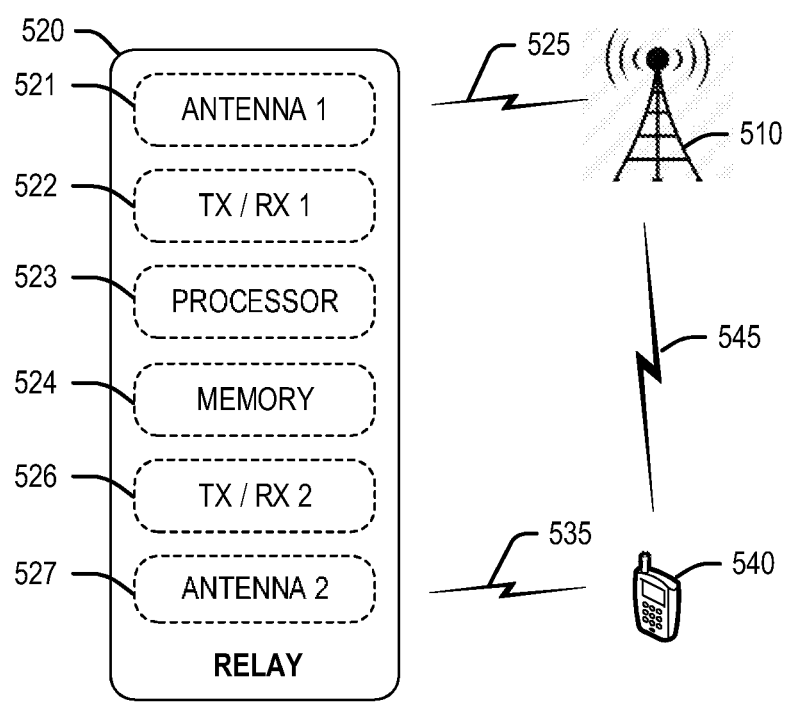
FIG. 5 depicts another exemplary relay access node.

In another exemplary embodiment, the relay access node may integrate components of a relay wireless device and a relay access point into a single unit. FIG. 5 depicts such an exemplary relay access node 520. Relay access node 520 is illustrated as comprising an antenna 521 for direct (i.e. unrelayed) communication with donor access node 510 via wireless backhaul link 525, a transceiver 522, a processor 523, and a memory 524 for storing instructions that are executed by processor 522 as described herein. Relay access node 520 further includes another transceiver 526 and antenna 527 for enabling communication with wireless device 540. Relay access node 520 can perform operations similar to those described with respect to FIG. 4.

In an embodiment, the relay access nodes depicted in FIG. 4-5 can be configured to function as one or more of a layer 1 (L1), layer 2 (L2), or layer 3 (L3) relay. A layer 1 relay functions as a booster or repeater. In other words, a layer 1 relay access node performs an amplify and forward (AF) function. RF signals received from a donor access node are amplified and transmitted to wireless devices. Likewise, RF signals received from wireless devices are amplified and transmitted to donor access nodes. Alternatively or in addition, a layer 2 relay access node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay access node also performs a decode and forward function. However, a layer 3 relay access node also performs additional processing (such as ciphering and/or data concatenation/segmentation/resassembly). In other words, relay access node depicted herein performs demodulation and decoding of the received RF signals (either uplink or downlink), processes received data, then encodes, modulates, and transmits the data to a wireless device.

Figure 6:
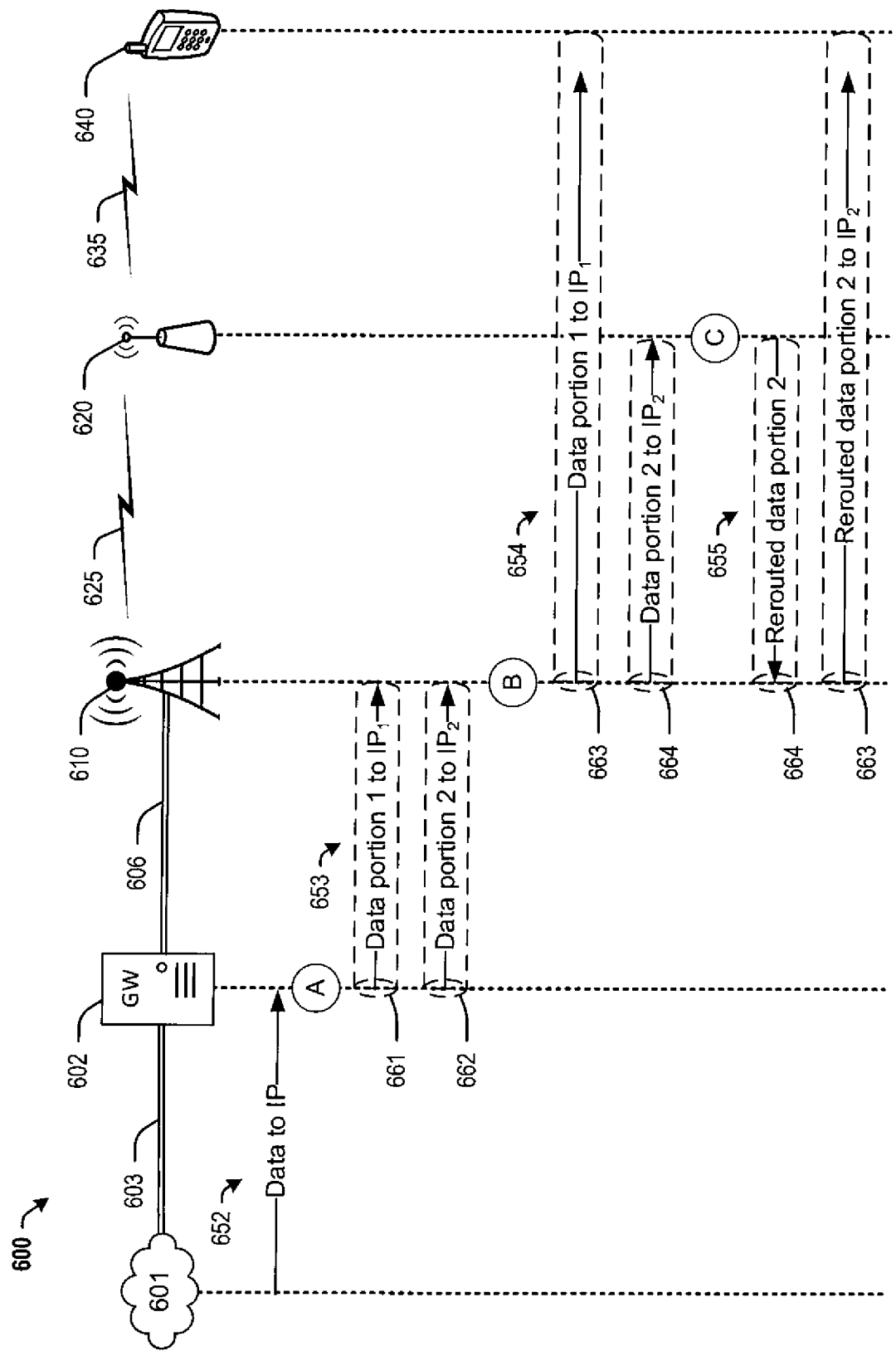
FIG. 6 depicts an exemplary network flow for communicating with a wireless device via at least two access nodes.

FIG. 6 depicts an exemplary network flow for communicating with a wireless device via at least two access nodes. The exemplary network flow of FIG. 6 may be implemented using components similar to those depicted in system 100, such as a network 601, gateway(s) 602, donor access node 610, relay access node 620, and wireless device 640. In this embodiment, communication link 603 may comprise any interface capable of connecting gateway 602 to a packet-based network 601, such as an S5 interface. Communication link 606 comprises any interface capable of connecting gateway 602 to donor access node 610, such as an S4, S5, S11, S1-MME, or S1-U interface. Donor access node 610, relay access node 620, and wireless device 640 communicate with one another via any number of wireless air-interfaces using LTE-uu or other wireless interfaces. Although FIG. 6 depicts components arranged (and steps performed) in a particular order for purposes of illustration and discussion, the components and operations discussed herein are not limited to any particular order or arrangement. One skilled in the art, using the disclosures provided herein, will appreciate that various features described herein can be omitted, rearranged, combined, and/or adapted in various ways. For example, although not shown herein, any number of additional components such as additional gateways, proxy servers, home subscriber servers (HSS), and signaling performed between elements, may be apparent to those having ordinary skill in the art in light of this disclosure.

Further, as described herein, wireless device 640 is capable of dual connectivity, i.e. simultaneously communicating with both donor access node 610 and relay access node 620. For example, wireless device 640 is configured with multi-access PDN connectivity (MAPCON), whereby wireless device 640 can send and receive data packets using two network addresses associated therewith. Wireless device 640 may be associated with at least one network address by default, such as an IP address $IP_1$, which may be assigned to wireless device 640 by one or more of MME 604, gateway(s) 602, and donor access node 610. For example, each of the at least two addresses are generated and mapped to a corresponding bearer, and the mapping of each IP address and corresponding bearer is shared with one or more of access nodes 610, 620, and wireless device 640. The determination to generate the second address $IP_2$ may be triggered based on attach requests from wireless device 640 that indicate that wireless device 640 is capable of attaching to both donor access node 610 and relay access node 620 simultaneously. Alternatively or in addition, a MAPCON capability of wireless device 640 may be determined based on a device capabilities message received at donor access node 610. In an alternative embodiment, the addresses $IP_1$ and $IP_2$ may comprise internal network addresses, i.e. IP addresses that are generated within the context of system 600, as opposed to a network address that is typically utilized by network entities accessible via network 601 in efforts to transmit data to wireless device 640.

At 652, data is received at gateway 602 and addressed to a first network address of wireless device 652. Upon receiving this data, gateway 602 performs method "A" further described in FIG. 7. For example, gateway 602 is configured to divide the data received from network 601 and addressed to wireless device 640 into first and second portions respectively addressed to the at least two addresses $IP_1$ and $IP_2$, and transmit the first and second portions to wireless device 640 via donor access node 610 and relay access node 620 respectively, based on the aforementioned bearer mapping. For example, at 653, the first portion may be transmitted in a first corresponding bearer 661 mapped to the first address $IP_1$, and the second portion may be transmitted in a second corresponding bearer 662 mapped to the second address $IP_2$. Bearers 661 and 662 may comprise evolved packet-switched system (EPS) bearers, and may be generated (either prior to receiving the data or upon receiving the data) by a P-GW coupled to or part of gateway 602. An S-GW that is part of gateway 602 may assign EPS bearer 661 to transmit the first data portion to donor access node 610 (via, for instance, an S1 interface 606), which then transmits the first data portion directly to wireless device 640 over a wireless air-interface. For example, an S-GW within gateway 602 may transmit data within bearer 661 to a network addresses associated with donor access node 610, which in turn transmits the data to the first network address $IP_1$ associated with wireless device 640. In addition, the S-GW within gateway 602 may assign EPS bearer 662 to transmit the second data portion to wireless device 640 via a combination of a relay gateway, donor access node 610 and relay access node 620. For example, a relay gateway within gateway(s) 602 may transmit data within bearer 662 to a network addresses associated with donor access node 610, which in turn transmits the data to a network address associated with relay access node 620. Thus, the mapping of each bearer 661, 662 may further include information related to network addresses of each of donor access node 610 and relay access node 620. Alternatively or in addition, gateway(s) 602 and access nodes 610, 620 are configured to communicate data within a specific bearer to the appropriate node.

Figure 8:
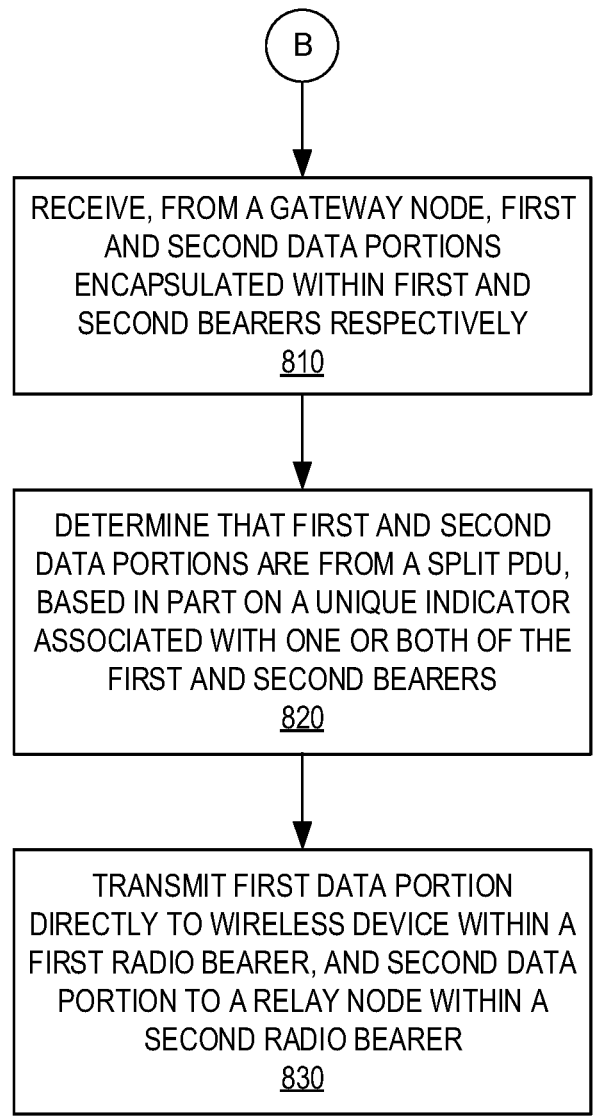
FIG. 8 depicts another exemplary method for communicating with a wireless device via at least two access nodes.

Upon receiving the data portions in their respective bearers, donor access node 610 is configured to perform method "B", further described with respect to FIG. 8. Briefly, donor access node 610 may determine that the first and second data portions are portions of a split PDU based in part on a unique indicator within a header of one or both of the first and second virtual bearers 661, 662. The unique indicator may comprise, for instance, any alphanumeric string included in a IP header of the virtual bearer. Based thereon, at 654, donor access node 610 transmit the first data portion directly to the first network address of end-user wireless device 640 via first radio bearer 663, and transmit the second data portion to relay access node 620 via second radio bearer 664. Upon receiving the second data portion, relay access node 620 performs method "C", further described with reference to FIG. 9. Briefly, relay access node 620 may be configured to determine that a signal condition in one or both of communication links 635, 625 deteriorates to beyond a threshold criteria and, at 655, forward the data packets (addressed to the second address of end-user wireless device 640) to donor access node 610 to be transmitted to end-user wireless device 640 directly via radio bearer 663 (or another radio bearer between donor access node 610 and end-user wireless device 640. The signal condition may be associated with wireless links 625 or 635. For example, the signal condition may comprise a threshold level of one or more of a signal-to-interference-plus-noise ratio (SINR), or a modulation and coding scheme (MCS) granted by donor access node 610 to relay access node 420. Either of these signal conditions meets a criteria when it crosses a low threshold, rendering communication links 625, 635 unsuitable to transmit downlink data. Alternatively or in addition, the signal condition may comprise an uplink power level granted to relay access node 620, an error rate of downlink data received at relay access node 620 from donor access node 610, a number of end-user wireless devices 640 attached to relay access node 630, or a traffic load of relay access node. Either of these signal conditions meets a criteria when it crosses a high threshold. Upon the signal condition not meeting the criteria, relay access node 620 can switch back to forwarding the second portions of subsequent data packets directly to end-user wireless device 640.

Figure 7:
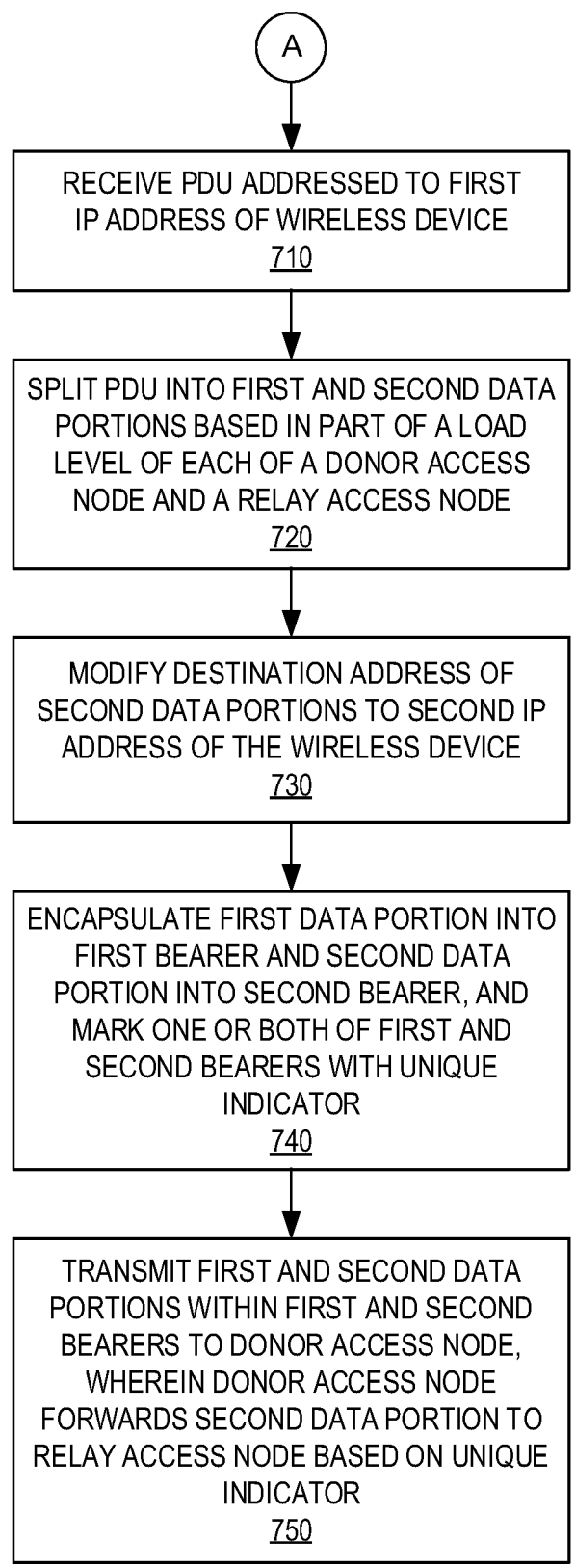
FIG. 7 depicts an exemplary method for communicating with a wireless device via at least two access nodes.

FIG. 7 depicts an exemplary method for communicating with a wireless device via at least two access nodes. The exemplary method of FIG. 7 may be implemented using components similar to those depicted in systems 100 and 600, such as a gateway node(s) 102, 602. Although FIG. 7 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 710, a data is received as being addressed to the wireless device (by way of a first network address, or a public network address). The data may comprise a protocol data unit (PDU), such as a data packet on a user plane of the wireless network. At 720, the data is divided or split into first and second data portions that are intended to be transmitted via first and second bearers respectively. For example, wireless devices capable of dual connectivity (as determined based on attach requests received at a controller node or a donor access node from the wireless device) are assigned with two network addresses, such as a second IP address generated for the wireless device in addition to the first IP address. Alternatively, two IP addresses may be generated, each of which comprises an internal network address, i.e. IP addresses that are generated within the context of the wireless network, as opposed to a network address that is typically utilized by network entities outside the wireless network, i.e. network nodes in communication with a gateway node. The first and second IP addresses are each mapped to a corresponding bearer, each of which traverses a corresponding access node and associated gateway(s). Further, the split of the data (e.g. PDU) may be based on a load level of each of a donor access node and a relay access node. For example, if the load of the relay access node is higher than a threshold load, then the first portion corresponding to the first bearer is larger than the second portion corresponding to the second bearer.

Further at 730, the destination address of the second data portion is changed to the second network address of the wireless device. This enables the second data portion to be transmitted within the second bearer and received at the second address of the wireless device, thereby enabling the wireless device to reconstruct the original PDU. Thus, at 740, the first and second data portions are encapsulated within bearers respectively mapped to the first and second destination addresses of the wireless device. For example, the first portion may be transmitted in a first corresponding bearer mapped to the first address, and the second portion may be transmitted in a second corresponding bearer mapped to the second address. Bearers may comprise evolved packet-switched system (EPS) bearers. Further, at least one of the first and second bearers is marked with a unique indicator. The indicator provides an indication to a donor access node that the downlink data is intended to be transmitted from the donor access node to the second network address of end-user wireless device via, for example, the relay node. In other words, the indicator is for ensuring that the donor access node (or any network node downstream from the gateway) is aware that the received second (or first) data portion comprises a portion of a split PDU and, therefore, to map it to additional bearers accordingly.

At 750, the first and second data portions are transmitted to the wireless device via a donor access node and a relay access node respectively, based on the bearer mapping. For example, the first EPS bearer is set up to transmit the first data portion to the donor access node (via, for instance, an S1 interface), which then transmits the first data portion directly to the wireless device over a wireless air-interface. Further, the second EPS bearer is set up to transmit the second data portion to a relay gateway (via, for instance, an S4 or S5 interface) to be forwarded to a relay access node via the donor access node (see FIG. 8), which then determines if the signal conditions are appropriate to transmit the second data portion to the wireless device directly or to reroute the second data portion through the donor access node, as further described with reference to FIG. 9.

FIG. 8 depicts another exemplary method for communicating with a wireless device via at least two access nodes. The exemplary method of FIG. 8 may be implemented using components similar to those depicted in systems 100 and 600, such as a donor access node 110, 610. Although FIG. 8 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 810, first and second data portions encapsulated within first and second bearers are received from a gateway node. The data portions may comprise split portions of a PDU, and may have been divided or split by the gateway node upon determining that the PDU is destined for a wireless device capable of dual connectivity. Further, each of the first and second data portions may be addressed respectively to first and second network addresses of the wireless device. At 820, the donor access node determines that the first and second data portions comprise portions of a split PDU based in part on a unique indicator associated with one or both of the first and second bearers. For example, at least one of the first and second bearers is marked with a unique indicator by the gateway node(s) from which the data portions are received. The indicator provides an indication to a donor access node that the downlink data is intended to be transmitted from the donor access node to the second network address of end-user wireless device via, for example, the relay node. In other words, the indicator is for ensuring that the donor access node (or any network node downstream from the gateway) is aware that the received second (or first) data portion comprises a portion of a split PDU and, therefore, to map it to additional bearers accordingly. At 830, the donor access node transmits the first data portion directly to the wireless device via a first radio bearer, and the second data portion to the relay access node, wherein the relay access node determines if the signal conditions are appropriate to transmit the second data portion to the wireless device directly or to reroute the second data portion through the donor access node, as further described with reference to FIG. 9.

Figure 9:
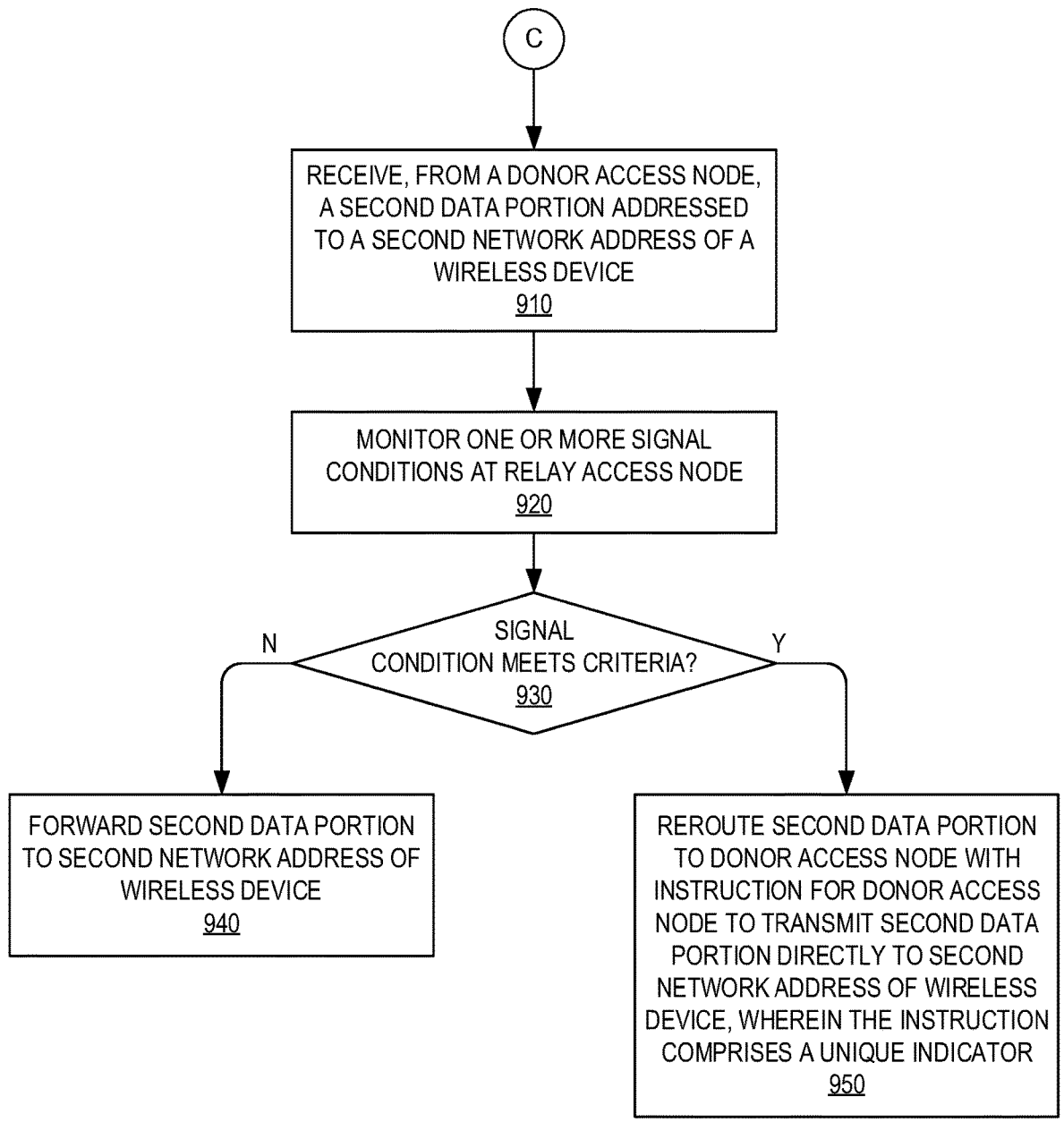
FIG. 9 depicts another exemplary method for communicating with a wireless device via at least two access nodes.

FIG. 9 depicts another exemplary method for communicating with a wireless device via at least two access nodes. The exemplary method of FIG. 9 may be implemented using components similar to those depicted in systems 100 and 600, such as a relay access node 120, 620. Although FIG. 9 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways At 910, the relay access node receives downlink data from the donor access node. The downlink data may comprise a portion of a protocol data unit (PDU), such as a data packet or similar unit of data. The PDU may be divided or split into one or more portions of data, with each portion of data being transmitted to the end-user wireless device via a different communication path, and to a different network address. For example, the PDU may be addressed to the first network address of the wireless device. Upon receiving the PDU, a network element such as a gateway node may split the PDU into first and second portions, map different bearers to each portion, and address each portion to the first and second network addresses respectively. For instance, the gateway (or any other core network node) may generate first and second internal IP addresses, which are both associated with the same wireless device, but are mapped to different bearers. Further, each of the first and second bearers is associated with a different access node. For example, the first bearer is associated with the donor access node, and the second bearer is associated with the relay access node, wherein the second bearer further traverses a relay gateway and the donor access node in order to reach the relay access node. Thus, the aforementioned downlink data that is rerouted from the relay access node to the donor access node comprises a portion of the PDU that was originally intended to be transmitted to the second network address of the end-user wireless device via the relay access node (and gateways associated therewith).

At 920, the relay access node monitors a signal condition associated therewith, and based on whether or not the signal condition meets a criteria at 930, determines whether or not to reroute the downlink data. The signal condition may be associated with a wireless link between the relay access node and the donor access node, or a wireless link between the relay access node and the end-user wireless device, and may further comprise a threshold level of one or more of a signal-to-interference-plus-noise ratio (SINR), a modulation and coding scheme (MCS) granted by the donor access node to the relay access node, an uplink power level granted to the relay access node, an error rate of downlink data received at the relay access node from the donor access node, a number of end-user wireless devices attached to the relay access node, or a traffic load of the relay access node. Thus, at 930, upon determining that the signal conditions do not meet the criteria, at 940 the relay access node transmits the second data portion directly to the end-user wireless device as intended. However, upon determining less-than-ideal signal conditions associated with delivery of downlink data to the end-user wireless device, at 950 the relay access node forwards its portion of the downlink data to the donor access node along with an instruction or indicator to the donor access node to transmit the downlink data directly to the end-user wireless device. The donor access node may be configured to perform operations comprising receiving the downlink data rerouted from the relay access node, and transmitting the downlink data to the end-user wireless device.

Further at 950, the relay access node maintains control of the transmission of the downlink data from the donor access node to the end-user wireless device, thereby reducing the frequency of handovers and retransmissions caused by the poor signal conditions determined by the relay access node. In other words, while the donor access node is instructed to transmit the downlink data directly to the second network address of the end-user wireless device, the relay access node maintains the control channel with the second network address of the end-user wireless device. To enable control of the data transmitted from the donor access node directly to the end-user wireless device, the control channel may connect the relay access node to the donor access node via gateways associated with both the relay access node and the donor access node, as further described herein and with reference to FIG. 10. Moreover, to ensure that the donor access node correctly transmits the rerouted downlink data to the second network address of the end-user wireless device, the relay access node is further configured to transmit an indicator to the donor access node that the downlink data is intended to be transmitted from the donor access node to the second network address of the end-user wireless device. The indicator may be transmitted to the donor access node (along with the rerouted downlink data) via a data channel between the relay access node and the donor access node. The data channel may be set up on a communication link on the wireless air interface of the donor access node to which the relay access node attaches, i.e. the backhaul link. Further, the data channel between the relay access node and the donor access node, as well as the control channel traversing the relay and donor gateways, may be implemented using X2 connections, including X2-U connections for the data channel and X2-C connections for the control channel.

Figure 10:
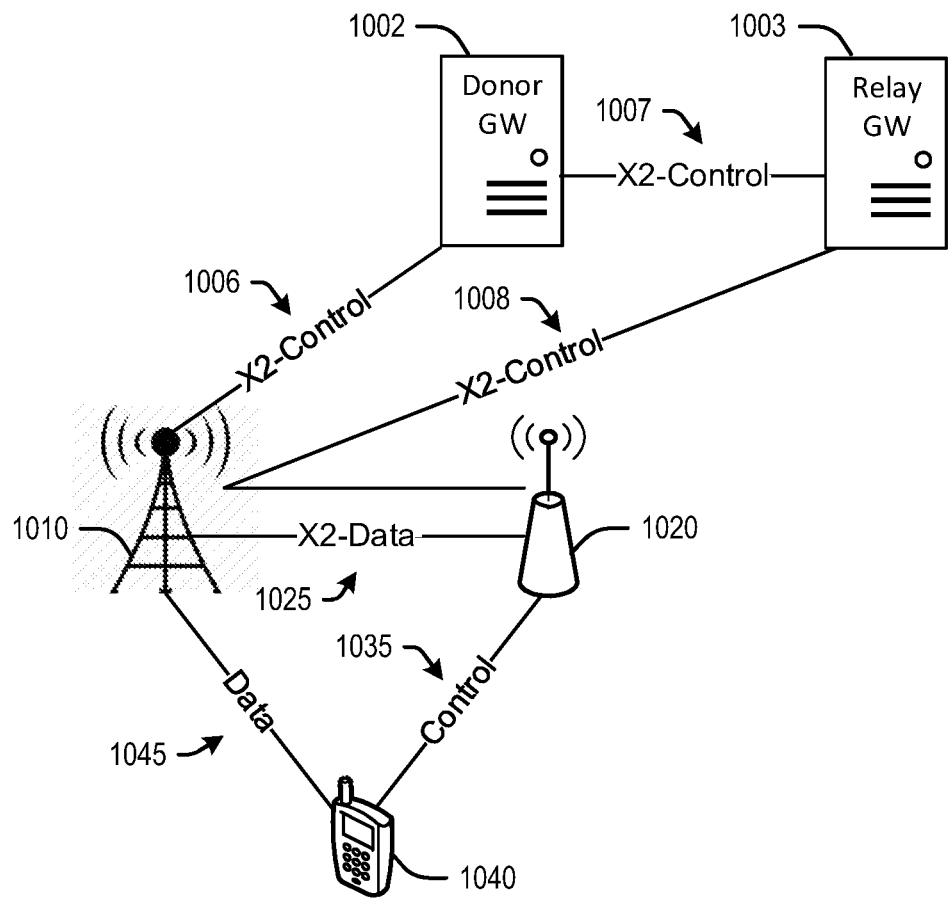
FIG. 10 depicts exemplary communication paths for communicating with a wireless device via at least two access nodes.

FIG. 10 depicts exemplary communication paths 1006, 1007, 1008, 1025, 1035, and 1045 for communicating with a wireless device via at least two access nodes. These exemplary communication paths may be implemented using components similar to those depicted in system 100, such as donor gateway node(s) 1002, relay gateway node(s) 1003, donor access node 1010, relay access node 1020, and wireless device 1040. In other embodiments, any other combination of donor access nodes, relay access nodes, and wireless devices may be evident to those having ordinary skill in the art in light of this disclosure. For example, in LTE systems, each of donor and relay gateway(s) 1002, 1003 comprise at least a packet data network (PDN) gateway (hereinafter, "P-GW") and a serving gateway (S-GW). Further, in this embodiment, communication link 1007 may comprise any interface capable of connecting donor gateway(s) 1002 to relay gateway(s) 1003, such as an S4, S5, S11, or similar interface. Communication link 1006 comprises any interface capable of connecting donor gateway(s) 1002 to donor access node 1010, such as an S4, S5, S11, S1-MME, or S1-U interface. Similarly, communication link 1008 comprises any interface capable of connecting relay access node to relay gateway(s) 1003, such as an S4, S5, S11, S1-MME, or S1-U interface. As illustrated herein, communication link 1008 traverses donor access node 1010, since relay access node 1020 is configured to access the core network (comprising gateway(s) 1002, 1003, as well as other network nodes) via the radio air interface provided by donor access node 1010.

Further, donor access node 1010, relay access node 1020, and wireless device 640 communicate with one another via any number of wireless air-interfaces using LTE-uu or other wireless interfaces. In this exemplary embodiment, donor access node 1010 may be a macrocell access node configured to deploy a wireless air-interface to which relay access node 1020 and wireless device 1040 can attach. Relay access node 1020 may be configured to communicate with donor access node 1010 over communication link 1025, hereinafter referred to as a wireless backhaul or simply "backhaul", while wireless device 1040 may be configured to communicate with donor access node 1010 over a wireless communication link 1045. Relay access node 1020 is further configured to deploy an additional wireless air-interface to which wireless device 1040 and other wireless devices (not depicted herein) can attach. Relay access node 1020 is thus configured to relay data between donor access node 1010 and wireless device 1040 such that wireless device 1040 may access network services using relay access node 1020 over communication link 1035, rather than overload donor access node 1010.

Further, as described herein, wireless device 1040 is capable of dual connectivity, i.e. simultaneously communicating with both donor access node 1010 and relay access node 1020. For example, wireless device 1040 is configured with multi-access PDN connectivity (MAPCON), whereby wireless device 1040 can send and receive data packets using two network addresses associated therewith. Further, to enable dual connectivity, two network addresses may be generated for wireless device 1040, each of the two addresses mapped to a corresponding bearer, downlink data packets divided into first and second portions respectively addressed to the at least two addresses, and transmitted to wireless device 1040 via donor access node 1010 and relay access node 1020 respectively. Thus, data addressed to wireless device 1040 may comprise a protocol data unit (PDU), such as a data packet or similar unit of data. The data may be divided into the first and second portions by splitting the PDU into the first and second portions. A size of the first and second portions of data may be determined based on a load level of each of donor access node 1010 and relay access node 1020.

Further, relay access node 1020 may be configured to determine that a signal condition in one or both of communication links 1035, 1025 deteriorates to beyond a threshold criteria, and forwards the second portion to donor access node 1010 to be transmitted to end-user wireless device 1040 via communication link 1045. In particular, relay access node 1020 may be configured to perform operations comprising receiving downlink data from donor access node 1020, the downlink data being a split portion of a PDU addressed to end-user wireless device 1040, determining that a signal condition meets a criteria and, in response to determining that the signal condition meets the criteria, rerouting the downlink data to donor access node 1010. Further, donor access node 1010 may be configured to perform operations comprising receiving the downlink data rerouted from relay access node 1020, and transmitting the downlink data to end-user wireless device 1040. The signal condition may be associated with wireless links 125 or 135. For example, the signal condition may comprise a threshold level of one or more of a signal-to-interference-plus-noise ratio (SINR), or a modulation and coding scheme (MCS) granted by the donor access node to the relay access node. Either of these signal conditions meets a criteria when it crosses a low threshold, rendering communication links 1025, 1035 unsuitable to transmit downlink data. Alternatively or in addition, the signal condition may comprise an uplink power level granted to relay access node 1020, an error rate of downlink data received at relay access node 1020 from donor access node 1010, a number of end-user wireless devices attached to relay access node 1020, or a traffic load of relay access node 1020. Either of these signal conditions meets a criteria when it crosses a high threshold.

Thus, upon determining less-than-ideal signal conditions associated with delivery of downlink data to end-user wireless device 1040, relay access node 1020 forwards its portion of the downlink data to donor access node 1010. Relay access node 1020 further maintains control of the transmission of the downlink data from donor access node 1010 to end-user wireless device 1040, thereby reducing the frequency of handovers and retransmissions caused by the poor signal conditions determined by the relay access node. In other words, while donor access node 1010 is instructed to transmit the downlink data directly to the second network address of end-user wireless device 1040 via a data channel established on communication link 1045, relay access node 1020 maintains a control channel with the second network address of end-user wireless device 1040 over communication link 1035. To enable control of the data transmitted from donor access node 1010 directly to end-user wireless device 1040, the control channel may connect relay access node 1020 to donor access node 1010 via communication link 1008 with relay gateway(s) 1003, communication link 1007 via donor gateway(s) 1002, and via communication link 1006. Further, a data channel may be set up on backhaul communication link 1025 and may be implemented using the X2 protocol. For example, X2-U protocol is used for the data channel 1025, while X2-C protocol is used for the control channel traversing communication links 1008, 1007, 1006.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for communicating with a wireless device via at least two access nodes, the method comprising:
   receiving, at a relay access node coupled to a donor access node, downlink data intended to be transmitted to an end-user wireless device attached to the relay access node, wherein the end-user wireless device is associated with a first network address and a second network address, the downlink data comprises a split portion of a downlink protocol data unit (PDU), wherein the downlink PDU is addressed to the first network address, the downlink PDU is split into the split portion and a remaining portion, the split portion is addressed to the second network address and the remaining portion is addressed to the first network address, and, subsequent to being split from the downlink PDU, the split portion is received via a bearer at the relay access node and the remaining portion via a different bearer at the donor access node;
   determining that a signal condition at the relay access node meets a criteria; and
   in response to determining that the signal condition meets the criteria, forwarding the downlink data to the donor access node,
   wherein the donor access node transmits the downlink data to the end-user wireless device, and
   wherein the relay access node maintains a control channel with the end-user wireless device.

2. The method of claim 1, wherein the signal condition is associated with one or both of a first wireless link between the relay access node and the donor access node, or a second wireless link between the relay access node and the end-user wireless device.

3. The method of claim 1, wherein:
   the signal condition comprises one or more of a signal-to-interference-plus-noise ratio (SINR), or a modulation and coding scheme (MCS) granted by the donor access node to the relay access node, and
   the criteria comprises a low threshold.

4. The method of claim 1, wherein:
   the signal condition comprises one or more of: an uplink power level granted to the relay access node, an error rate of downlink data received at the relay access node from the donor access node, a number of end-user wireless devices attached to the relay access node, or a traffic load of the relay access node, and
   the criteria comprises a high threshold.

5. The method of claim 1 wherein:
   the donor access node is instructed to transmit the downlink data directly to the second network address of the end-user wireless device, and
   the relay access node maintains the control channel with the second network address of the end-user wireless device.

6. The method of claim 5, further comprising transmitting, from the relay access node to the donor access node, an indication that the downlink data is intended to be transmitted from the donor access node to the second network address of the end-user wireless device.

7. The method of claim 6, wherein the downlink data and the indication are transmitted to the donor access node via a data channel between the relay access node and the donor access node.

8. The method of claim 1, further comprising:
   determining that the signal condition does not meet the criteria; and
   transmitting subsequent downlink data directly to the wireless device from the relay access node.

9. A system for communicating with a wireless device via at least two access nodes, the system comprising:
   a donor access node configured to provide a first radio air interface to which an end-user wireless device is attached, wherein the end-user wireless device is associated with a first network address and a second network address; and
   a relay access node configured to attach to the first radio air interface and to provide a second radio air interface to which the end-user wireless device is further attached;
   wherein the relay access node is further configured to perform operations comprising:
   receiving downlink data from the donor access node, wherein the downlink data comprises a split portion of a downlink protocol data unit (PDU), wherein the downlink PDU is addressed to the first network address, the downlink PDU is split into the split portion and remaining portion, the split portion is addressed to the second network address of the end-user wireless device, the remaining portion is addressed to the first network address, and, subsequent to being split from the downlink PDU, the split portion is received via a bearer at the relay access node and the remaining portion via a different bearer at the donor access node;

determining that a signal condition meets a criteria; and in response to determining that the signal condition meets the criteria, rerouting the downlink data to the donor access node, and wherein the donor access node is further configured to perform operations comprising:

receiving the downlink data rerouted from the relay access node; and transmitting the downlink data to the end-user wireless device.

10. The system of claim 9 wherein the donor access node is further configured to transmit the downlink data to the second network address of the end-user wireless device.

11. The system of claim 10, wherein:

the relay access node is further configured to transmit a unique indicator to the donor access node, and the donor access node is configured to transmit the downlink data to the second network address of the end-user wireless device in response to receiving the unique indicator.

12. The system of claim 9, wherein:

the signal condition comprises one or more of: a signal-to-interference-plus-noise ratio (SINR), or a modulation and coding scheme (MCS) granted by the donor access node to the relay access node, and the criteria comprises a low threshold.

13. The system of claim 9, wherein:

the signal condition comprises one or more of: an uplink power level granted to the relay access node, an error rate of downlink data received at the relay access node from the donor access node, a number of end-user wireless devices attached to the relay access node, or a traffic load of the relay access node, and the criteria comprises a high threshold.

14. The system of claim 9, wherein the relay access node transmits the downlink data to the donor access node via an X2 connection.

15. The system of claim 14, wherein the X2 connection further comprises a control channel, the control channel being set up between the relay access node and the second address of the wireless device, the control channel further traversing a relay gateway.

16. A processing node for communicating with a wireless device via at least two access nodes, the processing node being configured to perform operations comprising:

receiving, at a relay access node, data packets addressed to a wireless device, wherein the wireless device is associated with a first network address and a second network address, wherein the data packets are addressed to the second address of the wireless device, the data packets comprise a split portion of a downlink protocol data unit (PDU), wherein the downlink PDU is addressed to the first network address, the downlink PDU is split into the split portion and a remaining portion, the remaining portion is addressed to the first network address, and, subsequent to being split from the downlink PDU, the split portion is received via a bearer at the relay access node and the remaining portion via a different bearer at a donor access node communicatively coupled to the relay access node;

determining that a signal condition at the relay access node meets a threshold; and rerouting the data packets to the donor access node, wherein the donor access node forwards the data packets to the second address of the wireless device.

17. The processing node of claim 16, wherein the operations further comprise:

initiating an X2 interface between the relay access node and the donor access node; and transmitting a unique indicator from the relay access node to the donor access node via the X2 interface.

18. The processing node of claim 17, further comprising rerouting the data packets to the donor access node by transmitting the data packets to the donor access node via a user plane of the X2 interface.

* * * * *